SUPERREGENERATIVE PARAMETRIC AMPLIFIER

Filed June 8, 1960 3 Sheets-Sheet 1

INVENTOR.
WILLIAM D. WADE
BY
Lockwood, Woodard, Smith & Weikart
ATTORNEYS

SUPERREGENERATIVE PARAMETRIC AMPLIFIER

Filed June 8, 1960 3 Sheets-Sheet 2

INVENTOR.
WILLIAM D. WADE
BY
Lockwood, Woodard, Smith & Weikart
ATTORNEYS

SUPERREGENERATIVE PARAMETRIC AMPLIFIER

Filed June 8, 1960 3 Sheets-Sheet 3

INVENTOR.
WILLIAM D. WADE
BY
Lockwood, Woodard, Smith & Weikart
ATTORNEYS

United States Patent Office 3,365,668
Patented Jan. 23, 1968

3,365,668

SUPERREGENERATIVE PARAMETRIC AMPLIFIER

William D. Wade, Lafayette, Ind., assignor to The Magnavox Company, Fort Wayne, Ind., a corporation Filed June 8, 1960, Ser. No. 34,786
26 Claims. (Cl. 325—429)

This invention relates generally to amplifiers and more specifically to parametric amplifiers.

As the art of long-range electronic detection has been advanced, the need has become more predominant for a stable, low noise, means of amplifying received signals. This is particularly true in long-range radar and in long range submarine detection where received signals representing the object to be detected are rather weak. The necessity of stability and a low noise figure in the receiving apparatus is obvious. The use of high frequencies, particularly in ultra high frequency applications, has created interest in some rather unconventional means of amplification. Most microwave amplifiers have generally been characterized by use of electron beams in which the direct current kinetic or potential energy of free electrons is converted into alternating current energy for amplifying signals. These amplifiers have been limited in their utility by the amount of noise which they add to the signals being amplified. The result of this has been that attention has turned toward the use of parametric type amplifiers which lend themselves more readily to amplification of U.H.F. signals with low noise.

The present invention employs an inverting parametric amplifier which is driven into oscillation by an excess of pump signal and in which a variable reactance is controlled in such manner as to provide for alternate oscillation and quenching of the amplifier, thus producing stable, low noise amplification while preserving the frequency modulation of the input signals.

It is, therefore, a general object of this invention to obtain stable, low noise amplification of radio frequency signals.

It is a further object of this invention to obtain low noise amplification of radio frequency signals at ultra high frequency.

It is a still further object of this invention to attain the foregoing objects and at the same time preserve the information content of the input signals.

Other objects, advantages and uses of this invention will be recognized and appreciated when the description thereof is read with reference being made to the several figures of drawing in which like parts are represented by identical reference numerals:

Figure 1:
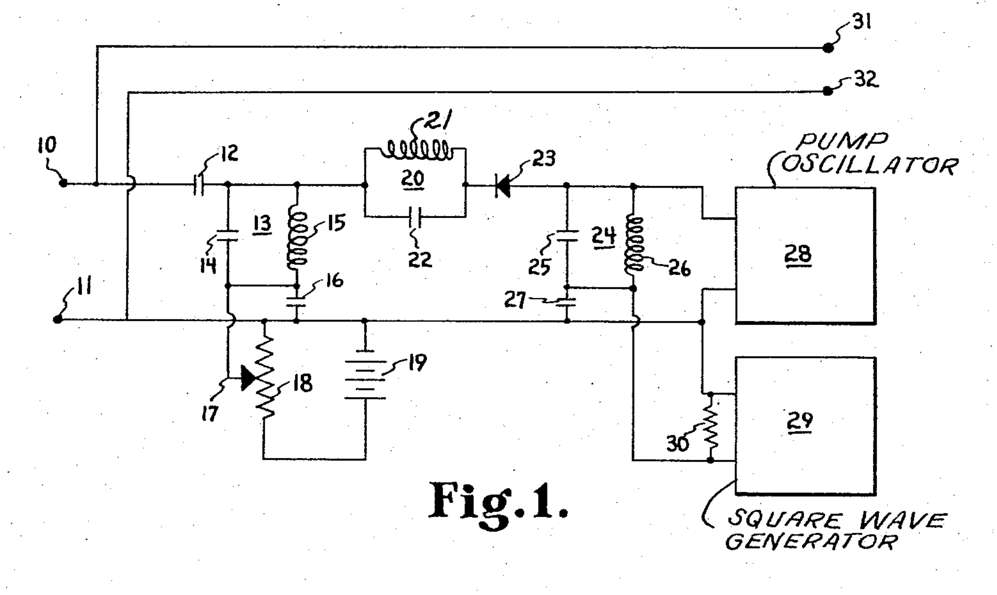
FIG. 1 shows a schematic diagram of a typical embodiment of this invention.

Referring to the embodiment of the invention shown in FIG. 1, input terminals 10 and 11 are provided to receive radio frequency input signals to be amplified. Terminal 10 is coupled through coupling capacitor 12 to the tank circuit 13 consisting of capacitance 14 and inductance 15 which are connected in parallel. The tank circuit 13 is coupled through coupling capacitance 16 to the input terminal 11. The input terminal 10 is also coupled through a tank circuit 20 consisting of capacitance 22 and inductance 21 and through the diode 23 to tank circuit 24 consisting of capacitance 25 and inductance 26 in parallel. Tank circuit 24 is coupled through capacitance 27 to the terminal 11.

A pump oscillator 28 having its output connected across the series combination of tank circuit 24 and coupling capacitance 27 provides a source of power to drive the amplifier. A square wave generator 29 has one of its output terminals coupled to the terminal 11 and the other output terminal coupled to the common connection between tank circuit 24 and the coupling capacitance 27. A resistance 30 is shown connected across the output of the square wave generator 29 and is used to complete a direct current (DC) circuit to provide a reverse bias across the diode 23. The bias is provided by means of a direct current source represented by the battery 19 having its negative terminal connected to input terminal 11 and having its positive terminal connected through a portion of the resistance element of potentiometer 18 and its movable tap 17 connected to the common connection between tank circuit 13 and the coupling capacitance 16.

Figure 2:
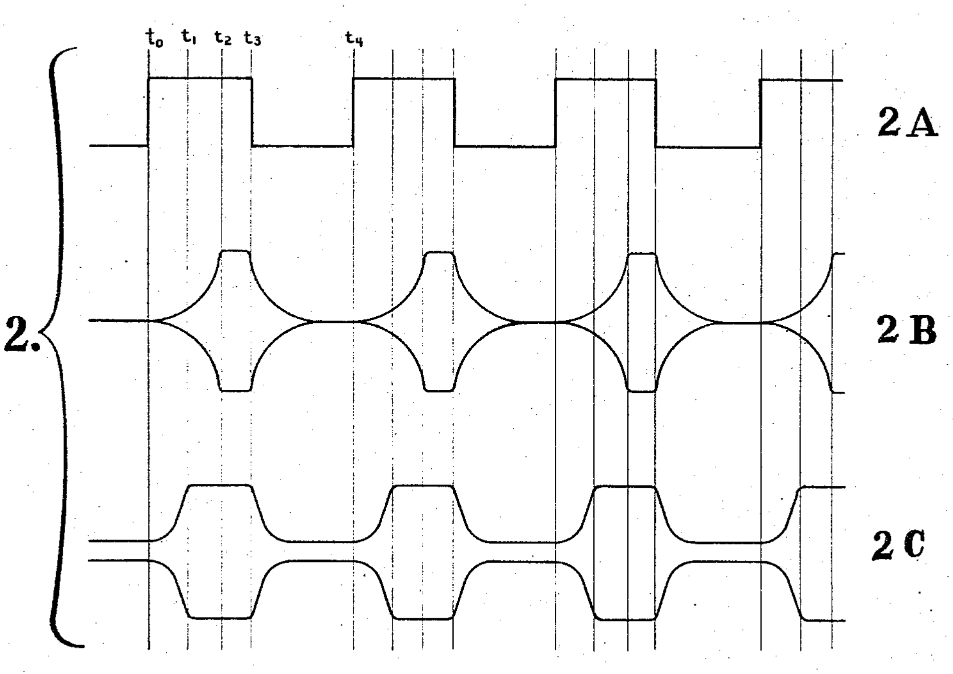
FIG. 2 shows wave forms pertinent in the operation of the embodiment shown in FIG. 1.

Referring to FIG. 2, there is shown in FIG. 2A a wave form representative of the output of the square wave generator 29 of FIG. 1. In FIG. 2B there is shown a wave form representative of the output at terminals 31 and 32 of the amplifier shown in FIG. 1 when there is no signal input at the terminals 10 and 11. In FIG. 2C there is shown a representation of the amplifier output at terminals 31 and 32 of the embodiment of FIG. 1 when a signal input is present at the terminals 10 and 11.

Figure 3:
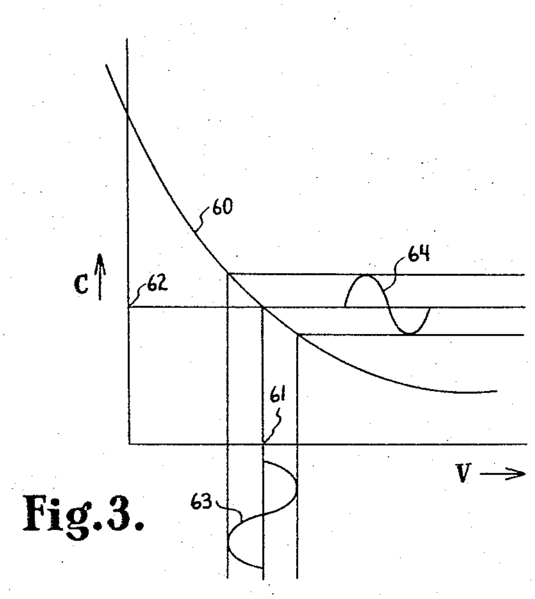
FIG. 3 shows a typical operating characteristic of the biased diode which is used in the embodiment of the invention shown in FIG. 1.

FIG. 3 shows the characteristic of the diode 23 of FIG. 1. Being back biased, the diode appears as a capacitor whose capacitance depends upon the instantaneous voltage across its terminals. In FIG. 3, the vertical coordinates represent capacitance and the horizontal coordinates represent voltage. The variation in effective capacitance with voltage across the diode is represented by curve 60. With a reverse bias represented by the voltage at point 61 across a diode, the capacitance is that represented by point 62. By superimposing upon the diode biasing voltage 61, a signal having a voltage variation represented by wave form 63, the capacitance can be varied in the manner represented by wave form 64. The reverse biased diode is sometimes called a varactor.

Figure 4:
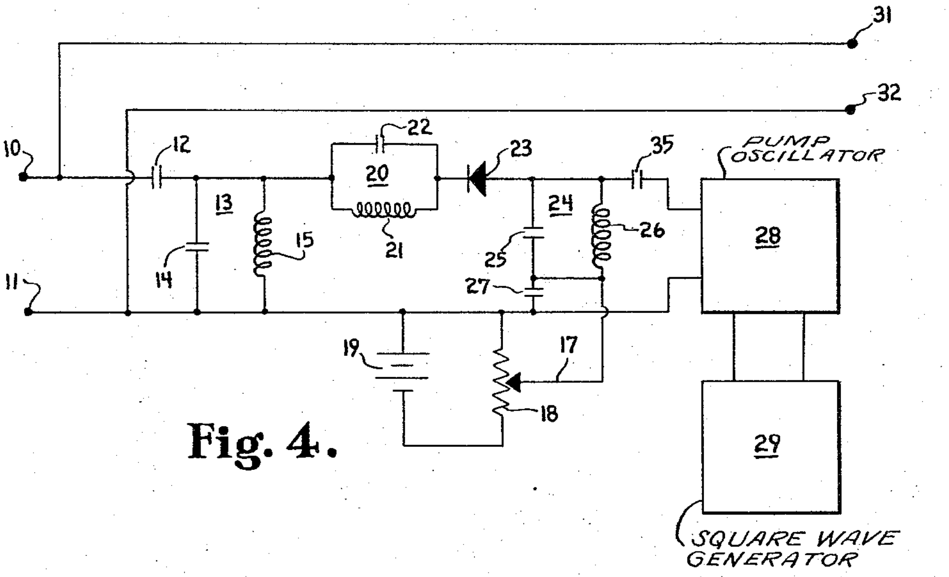
FIG. 4 shows another embodiment of the present invention in which modulation of the pump oscillator to produce alternate oscillation and quenching in the amplifier is accomplished directly by a modulating square wave generator.

Referring to FIG. 4 there is shown a parametric amplifier similar to the embodiment shown in FIG. 1 with the exception that the square wave generator 29 has its output coupled directly to the pump oscillator 28. Another distinction is that the pump oscillator is coupled through the capacitance 35 to the tank circuit 24. In this instance the battery 19 has its positive terminal connected to the input terminal 11. Again, as in FIG. 1, the resistance element of potentiometer 18 is connected across the battery terminals. However, in FIG. 4 the variable tap 17 of potentiometer 18 is connected to the common connection between tank circuit 24 and the junction between tank circuit 24 and coupling capacitance 27.

Figure 5:
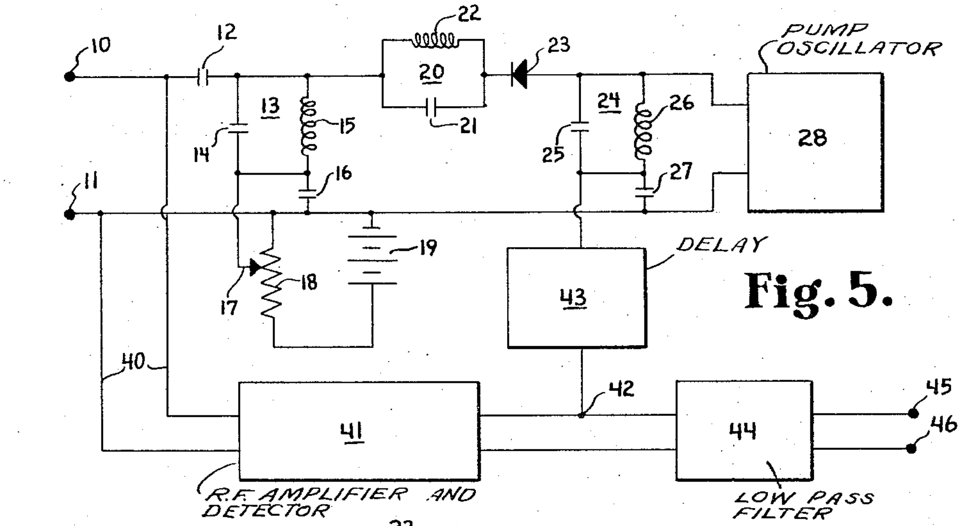
FIG. 5 shows another embodiment of the present invention in which alternate quenching and oscillation of the amplifier is produced by the amplifier output to obtain a control signal.

Referring to FIG. 5, there is shown another embodiment of the present invention in which the quenching of the amplifier is controlled by means of the detected output obtained from the leads 40. R.F. amplifier and detector 41 is coupled across the input terminals 10, 11 by means of leads 40. The output of detector 41 is passed through the delay network 43 which is coupled between tank circuit 24 and one of the output leads of the detector 41. A low pass filter 44 is connected to the output of the detector 41 and produces an audio output at terminals 45 and 46.

Figure 6:
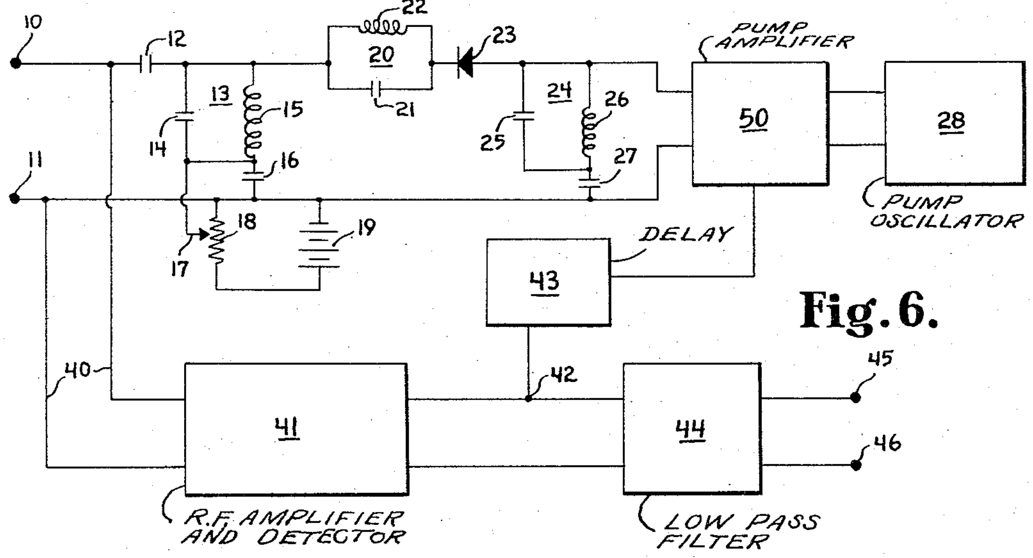
FIG. 6 shows still another embodiment of the invention with a variation of the method used in FIG. 5 to obtain the alternate oscillation and quenching of the amplifier.

In FIG. 6, there is shown another embodiment of the present invention similar to that of FIG. 5 with the exception that the delay network 43 is connected to a pump amplifier 50 which is coupled between the pump oscillator 28 and the tank circuit 24.

Figure 7:
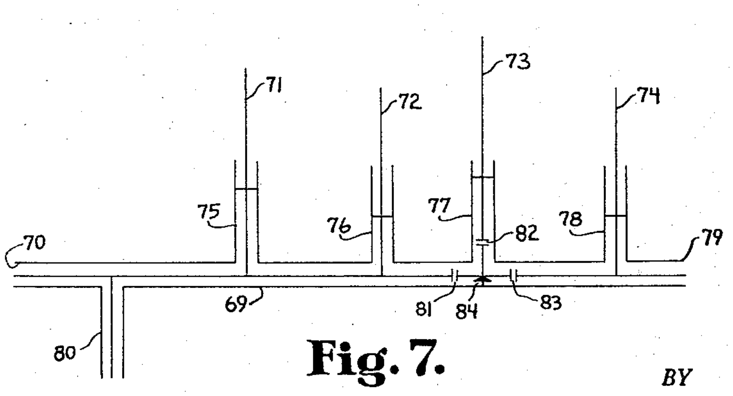
FIG. 7 shows schematically an embodiment of a parametric amplifier using tuned lines such as would be employed at microwave frequencies.

Referring to FIG. 7, there is shown a schematic diagram of a parametric amplifier using tuned lines. In this amplifier coaxial line 69 has an input at 70 for the signal to be amplified. The coaxial line 69 has a number of branches 75, 76, 77 and 78 which may be tuned to resonant frequencies by means of the tuning stubs 71, 72, 73 and 74, respectively. A signal from a pump oscillator such as a reflex klystron, for example, may be applied to the line 69 at the end 79. The varactor diode 84 is shown connected between the outer conductor and the inner conductor of the coaxial line 69 and is associated with the central conductor of the line on the signal input side by the coupling condenser 81. It is associated with the central conductor of tuning branch 77 through the coupling condenser 82 and is associated with the input from the pump oscillator by means of a coupling condenser 83. A signal output from the tuned lines is available at the branch 80. The amplifier using tuned lines is adaptable to produce oscillation and quenching in the same manner as are the circuits shown in FIGS. 1, 4, 5 and 6.

Operation of the invention will be more readily appreciated if it is first noted that an inverting parametric amplifier having a storage element with characteristics of a variable capacitance, is an inherently regenerative device having a power gain proportional to $$\left[\frac{1}{1-K(\Delta C)^2}\right]_2$$

where ΔC is the variation in the variable capacitance caused by the pump oscillator voltage. The amplitude of ΔC for a particular pump output and certain types of variable storage elements may be varied by varying the parametric amplifier bias. Therefore, by using a low frequency oscillator with the circuit, in addition to the pump oscillator, ΔC may be varied in such a way that the parametric amplifier alternately oscillates and is quenched, thereby becoming super regenerative. This effect is achieved with a low frequency oscillator in the embodiments of the invention shown in FIGURES 1 and 4.

In the operation of the embodiment of the invention shown in FIG. 1, an R.F. voltage having a frequency of $f_3$ and generated in pump oscillator 28, enters the tank circuit 24 consisting of capacitance 25 and the inductance 26. Capacitance 25 and inductance 26 have been adjusted so that they form a tank circuit which is resonant to the frequency $f_3$ and, therefore, the signal from the pump oscillator appears as a relatively high voltage across the tank circuit 24. The tank circuits 13 and 20 have been tuned to frequencies different from $f_3$ and, therefore, nearly all of the voltage across the tank circuit 24 appears across the diode 23. The tank 13 has been tuned to a frequency $f_1$ and the tank 20 has been tuned to a frequency $f_2$ such that $f_1$ plus $f_2$ is equal to $f_3$.

The battery 19 places a fixed bias across the diode 23 so that the diode is back biased into the region where it appears as a non-linear capacitor and has a characteristic as is shown in FIG. 3. The potentiometer 18 is used to adjust this bias. The capacitances 12, 16 and 27 are D.C. blocking capacitances having low reactances at frequencies $f_1$, $f_2$ and $f_3$.

The square wave generator 29 has a direct current path across its terminals such as is represented by resistance 30 to complete the bias circuit.

The non-linear capacitance presented by the diode 23 to the pump signal at frequency $f_3$ causes a distorted current to flow through the tanks 13 and 20 and if the signal from the pump is strong enough these distortion components will include components at frequencies $f_1$ and $f_2$ which are the frequencies of resonant circuits 13 and 20, respectively. These distortion components produce relatively high voltage at frequencies $f_1$ across tank circuit 13 and at frequency $f_2$ across the direct circuit 20.

The square wave generator 29 is used to alternately shift the bias across the diode 23 to and away from the point where oscillations at frequencies $f_1$ and $f_2$ in the tanks 13 and 30 build up. This effect is illustrated in FIG. 2A where at time $t_0$ the square wave rises to a positive maximum at which time the amplifier output shown in FIG. 2B begins to rise toward a maximum amplitude which it reaches at the time $t_2$. When the square wave of FIG. 2A drops back to its original level at the time $t_3$, the amplifier is moved away from the point where oscillations build up at frequencies $f_1$ and $f_2$. Accordingly, the amplifier output, as shown in FIG. 2B is attenuated or quenched and has vanished by the time $t_4$ of the next increase in the square wave output. It can be seen that the output across terminals 31 and 32, which is essentially the output across the tank 13, will constitute a series of pulses of R.F. energy whose frequency is $f_1$ and whose pulse repetition rate is determined by the frequency of the square wave generator 29.

If a signal having a frequency $f_1$ is present at the input terminals 10 and 11, the oscillations in the tank circuit 13 at frequency $f_1$ build up more rapidly beginning at time $t_0$ of FIG. 2. Accordingly, the pulses at the output terminals 31 and 32 as illustrated in FIG. 2C are wider than those of FIG. 2B where there was no input signal at terminals 10 and 11. If during the build up of oscillations across the tank 13 sufficient time is allowed for saturation before the next subsequent decrease of the square wave output, the output as shown in FIG. 2C will have a pulse duration which is dependent upon the amplitude of the signal input. However, if the amplifier does not become saturated before quenching, the amplitude of the output pulses will depend both on the strength of the signal input and on the length of time the amplifier has been turned on before quenching.

In the operation of the embodiment shown in FIG. 4 the output of the square wave generator is fed directly to the pump oscillator 28 for modulation such that its output is periodically on and off. This produces substantially the same effect at the output terminals 31 and 32 as does the embodiment of FIG. 1.

A super regenerative parametric amplifier may also be obtained according to the invention by detecting the output of an inverting parametric amplifier and using this output to produce the alternate oscillation and quenching. Accordingly, in the embodiment shown in FIG. 5 the output of the parametric amplifier which appears across the leads 40 is amplified and detected by the amplifier and detector 41 which produces a detected output which is coupled through the delay network 43 to the tank circuit 24. The time constant of the delay network is adjusted so that quenching of the amplifier is obtained at the desired rate such as, for example, 20 kc.

FIG. 6 shows an embodiment of the parametric amplifier of this invention where the output of the delay network is used to control the pump input to the tank circuit 24. The control is by means of the output of the delay network which is fed to the pump amplifier 50 and which causes the circuit to quench at the desired rate to produce the same effect on the output as does the embodiment of FIG. 5.

The parametric amplifier of FIG. 7 may be readily controlled according to the invention in any of the ways illustrated by the embodiments shown in FIGS. 1, 4, 5 and 6.

The various embodiments of the present invention which are shown in FIGS. 1, 4, 5 and 6 take advantage of the very narrow range of applied pump voltage which will provide stable amplification in an inherently regenerative inverting parametric amplifier, by allowing the amplifier to periodically break into oscillation and then quench. The output of the saturating type of super-regenerative parametric amplifier consists of pulses of R.F. voltage whose peak amplitude is constant and depends on the saturation characteristics of the amplifier The duration of the pulses is a function of the amplitude of the signal input. It is seen, therefore, that the saturating super regenerative amplifier is actually a modulator which converts amplitude modulation to pulse duration modulation and has a fixed stable gain. Frequency modulation is preserved since the frequency of the output RF pulses is dependent on the input frequency. In the non-saturating type, the amplitude of output pulses depends on both the length of time that the amplifier is turned on, and the strength of the input signal. Therefore, in the non-saturating type, amplitude modulation of the input signal is converted to pulse amplitude modulation.

In order to preserve the information contained in the amplitude modulation of the input signal, the quench frequency must be made at least twice as great as the highest frequency contained in the original modulation. The modulation signal at the output of the amplifier can be recovered by filtering (averaging) the detected pulses with a low pass filter (integrator) designed to reject the quench frequency but pass the original modulation.

The power gain of the saturating type is:

$$G_p=\left(\frac{4_{g_1}}{g_g}\right)\left(\frac{E_{max}}{E_s}\right)^2\frac{f_q{}^2}{(1-\alpha)2}\left[\frac{\ln^{E_s+E_n}}{E_n}\right]^2\left(\frac{ZQ_1}{2\pi f_1}\right)^2$$

where $g_l$=load conductance
$g_g$=generator conductance
$E_{max}$=saturation voltage of the amplifier
$E_s$=amplitude of the input signal (open circuit)
$f_q$=quench frequency
$E_n$=noise voltage at the input when the amplifier is turned on
$Q_1$=circuit Q at $f_1$ $$\alpha=\pi^2 f_1 f_2 C_1{}^2/4g_1g_2$$

$f_1$=input signal frequency
$f_2$=resonant frequency of the idler tank
$g_1$=conductance of tank circuit 13+$g_g$+$g_l$
$g_2$=conductance to tank circuit 20
and
$2C_1$=peak-to-peak variation of capacitance of the nonlinear capacitor diode at the pump frequency.

From the above expression it is seen that as $\alpha$ increases toward unity $G_p$ increase toward infinity and for $\alpha \geq 1$ the amplifier oscillates.

The power gain of the non-saturating type is:

$$G_p=\frac{g_1}{g_g}f_q{}^2\left\{\frac{1}{\alpha-1}-\frac{1_{exp}}{T}[(\alpha-1)t_1]+\frac{1}{\alpha-1}-\frac{1_{exp}}{T}\left[(\alpha-1)t_1+\frac{t_1-\frac{1}{f_q}}{T}\right]\right\}^2$$

where $T$=time constant of the decay of oscillation when the oscillations are quenched
$t_1$=length of time the amplifier is turned on.

While the invention has been disclosed and described in some detail in the drawings and the foregoing description, they are to be considered as illustrative and not restrictive in character, as other modifications may readily suggest themselves to persons skilled in this art and within the broad scope of the invention, reference being had to the appended claims.

What is claimed is:

1. A superregenerative parametric amplifier comprising: a parametric amplifier having signal input and output means; a source of power coupled to said parametric amplifier; and means coupled to said parametric amplifier to provide alternate oscillation and quenching in said amplifier whereby amplifying characteristics of said parametric amplifier are controlled.

2. A superregenerative parametric amplifier comprising: a parametric amplifier having signal input and output means; a pump oscillator coupled to said parametric amplifier; a low frequency oscillator coupled to said parametric amplifier to provide a varying bias therein to obtain alternate oscillation and quenching in said amplifier whereby amplifying characteristics of said parametric amplifier are controlled.

3. A parametric amplifier comprising: an amplifier circuit having a variable storage element therein and having a signal input and a signal output; a pump oscillator coupled to said amplifier; and an oscillator having frequency substantially lower than that of said pump oscillator and coupled to said amplifier circuit for varying the storage characteristics of said storage element in predetermined manner whereby said amplifier alternately oscillates and is quenched.

4. A superregenerative parametric amplifier comprising: a parametric amplifier having signal input and output means; a pump oscillator coupled through a pump output amplifier to said parametric amplifier; a detector coupled to said output means to detect the output thereon; means coupling said detector to said pump output amplifier to control the voltage of the input to said parametric amplifier from said pump output amplifier whereby the amplifying characteristics of said parametric amplifier are controlled.

5. A superregenerative parametric amplifier comprising: a parametric amplifier having signal input and output means; a pump oscillator coupled to said amplifier; a detector coupled to said output means to detect the output thereon; a delay circuit coupled to said detector and to said parametric amplifier for using the output of said detector to control the amplifying characteristics of said parametric amplifier.

6. A superregenerative parametric amplifier comprising: input means for signals to be amplified; a first tank circuit coupled to said input means; an oscillator to provide a source of power for said amplifier; a second tank circuit and a means adapted to produce a variable reactance, said variable reactance means and second tank circuit being in a coupling between said first tank circuit and said source of power; a third tank circuit coupled to said source of power; and output means coupled to said input means; and means coupled to said third tank circuit to provide alternate oscillation and quenching in the amplifier.

7. The amplifier of claim 6 wherein said means to produce a variable reactance is a reverse biased diode.

8. The amplifier of claim 6 wherein said first, second and third tank circuits are resonant circuits.

9. The amplifier of claim 8 wherein the said tanks are resonant at such frequencies that the resonant frequency of the third tank circuit is substantially equal to the sum of the resonant frequencies of the first and second tank circuits.

10. The amplifier of claim 9 wherein said second tank circuit is resonant at a higher frequency than said first tank circuit.

11. A superregenerative parametric amplifier comprising: input terminals for signals to be amplified; a first tank circuit in a coupling across said terminals; a second tank circuit, a variable reactance means and a third tank circuit serially coupled in a coupling across said terminals; oscillator means coupled to said third tank circuit to provide a source of power; output means coupled to said terminals; and means coupled to said variable reactance means for effecting a periodically varying bias thereon to provide alternate oscillation and quenching in the amplifier.

12. A superregenerative parametric amplifier comprising: input terminals for signals to be amplified; a first resonant circuit in a coupling across said terminals; a second resonant circuit, a biased variable reactance means, and a third resonant circuit serially coupled in a coupling across said terminals; oscillator means coupled to said third resonant to provide a source of power; output means coupled to said terminals; and means coupled to said variable reactance means for periodically shifting the bias thereon to provide alternate oscillation and quenching in the amplifier.

13. A superregenerative parametric amplifier comprising: input terminals for signals to be amplied; a first tank circuit in a coupling across said terminals; a second tank circuit, a biased variable capacitance means and a third tank circuit serially coupled in a coupling across said terminals; oscillator means coupled to said third tank circuit to provide a source of power; output means coupled to said terminals; and means coupled to said variable capacitance for periodically shifting the bias thereon to provide alternate oscillation and quenching in the amplifier.

14. A superregenerative parametric amplifier comprising: input means for signals to be amplified; a first tank circuit coupled to said input means; an oscillator to provide a source of energy for said circuit; a second tank circuit and a unidirectional means in a coupling between said first tank circuit and said oscillator; a third tank circuit coupled to said oscillator; means coupled to said unidirectional means to provide a bias thereacross; means coupled to said unidirectional means to periodically shift the bias thereacross to provide alternate oscillation and quenching in said amplifier; and output means coupled to said input means.

15. A superregenerative parametric amplifier comprising: a pair of terminals for input signals to be amplified; a first tank circuit coupled across said terminals; a second tank circuit, a diode, and a third tank circuit serially coupled across said terminals; means coupled to said diode to provide a reverse bias thereacross; an oscillator coupled across said third tank circuit to provide a source of power to drive said circuit; output means coupled to said pair of terminals and including a detector having an output; a variable delay means coupled between said detector output and said third tank circuit to utilize a detected output of said amplifier to produce alternate oscillation and quenching in said amplifier whereby input signals are amplified.

16. The amplifier of claim 15 wherein said tank circuits are resonant circuits.

17. The amplifier of claim 16 wherein said tank circuits are resonant circuits such that the resonant frequency of the third tank circuit is substantially equal to the sum of the resonant frequencies of said first and second tank circuits.

18. The amplifier of claim 17 wherein said second resonant circuit is tuned to a frequency which is greater than that to which the first resonant circuit is tuned.

19. A superregenerative parametric amplifier comprising: a pair of terminals for input signals to be amplified; a first tank circuit coupled across said terminals; and second tank circuit, a diode and a third tank circuit serially coupled across said terminals; means coupled to said diode to provide a reverse bias thereacross; an oscillator coupled to said third tank circuit through a pump amplifier coupled across said third tank circuit to provide a source of power to drive said circuit; output means coupled to said pair of terminals and including a detector having an output; a variable delay means coupled between said detector output and said pump amplifier to control the output of said pump amplifier to produce alternate oscillation and quenching in the parametric amplifier whereby input signals are amplified.

20. The amplifier of claim 19 wherein said tank circuits are resonant circuits.

21. The amplifier of claim 20 wherein said tank circuits are resonant circuits such that the resonant frequency of the third tank circuit is substantially equal to the sum of the resonant frequencies of said first and second tank circuits.

22. The amplifier of claim 21 wherein said second resonant circuit is tuned to a frequency which is greater than that to which the first resonant circuit is tuned.

23. A superregenerative parametric amplifier comprising: a pair of terminals for input signals to be amplified; a first tank circuit in an alternating current coupling across said terminals; a second tank circuit, a diode, and a third tank circuit serially coupled in an alternating current coupling across said terminals; means coupled to said diode to provide a reverse bias thereacross; an oscillator coupled across said third tank circuit to provide a source of power to drive said circuit; output means coupled to said pair of terminals; and a square wave generator coupled to said diode to produce a variable bias thereacross whereby periodic oscillation and quenching in said amplifier produces stable amplification of said input signal.

24. The amplifier of claim 23 wherein said tank circuits are resonant circuits.

25. The amplifier of claim 24 wherein said tank circuits are resonant such that the resonant frequency of the third tank circuit is substantially equal to the sum of the resonant frequencies of said first and second tank circuits.

26. The amplifier of claim 25 wherein said second resonant circuit is tuned to a frequency greater than that to which said first resonant circuit is tuned.

References Cited

UNITED STATES PATENTS

| | | | |
|---|---|---|---|
| 2,719,223 | 9/1955 | Van Der Ziel et al. | 250—20 |
| 2,838,687 | 6/1958 | Clary | 250—20 |

OTHER REFERENCES

Bossard and Younger et al., "Letters," Proceedings of the IRE, July 1959, pages 1270–1274 (copy in Scientific Library).

Proc. I. R. E. July 1958, vol. 46, No. 7, pages 1383–1386, "A Parametric Amplifier Using Lower Frequency Pumping," Chang et al.

KATHLEEN H. CLAFFY, *Primary Examiner.*

S. B. PRITCHARD, HARRY GAUSS, DAVID G. REDINBAUGH, ROBERT H. ROSE, *Examiners.*

R. F. ROTELLA, J. R. GAFFEY, R. LAKE, E. C. MULCAHY, R. LINN, *Assistant Examiners.*